June 8, 1937.  R. M. SLOUGH  2,083,102
SAFETY SIGN
Filed April 27, 1936
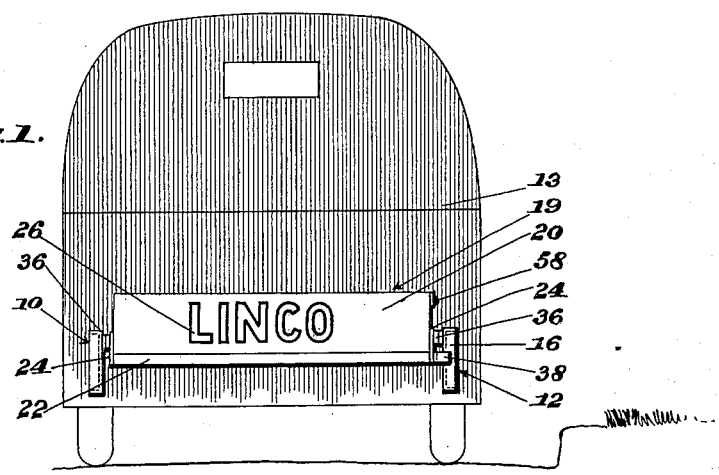
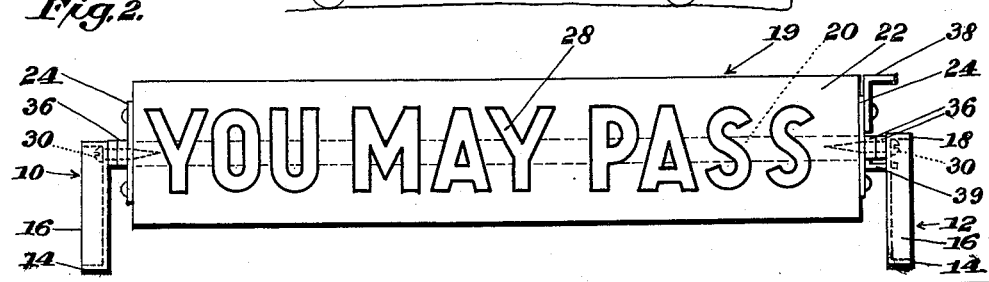
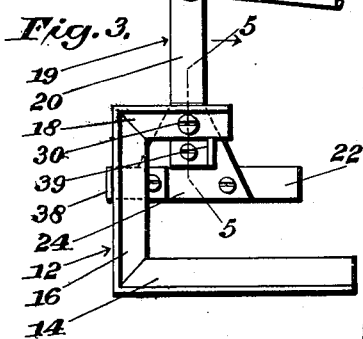
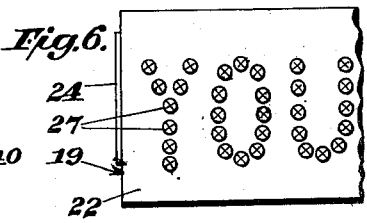
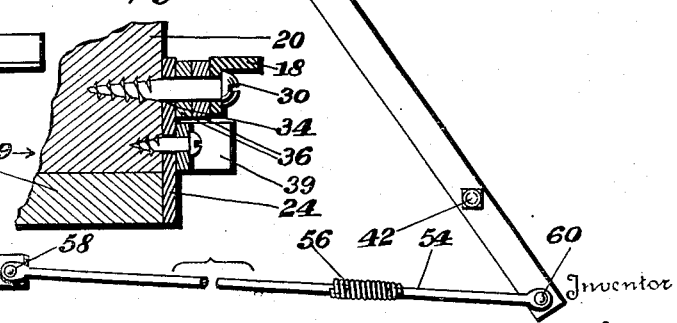
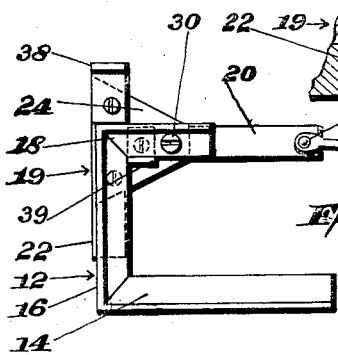
Inventor
Ralph M. Slough
By Munn Anderson & Freddy
Attorney Patented June 8, 1937

2,083,102

UNITED STATES PATENT OFFICE 2,083,102

SAFETY SIGN

Ralph M. Slough, Findlay, Ohio, assignor to The Ohio Oil Company, Findlay, Ohio, a corporation of Ohio Application April 27, 1936, Serial No. 76,662

1 Claim. (Cl. 116—30)

The safety sign comprising the present invention is designed for use in connection with large slow-moving trucks and trailers which ordinarily have a tendency to impede the normal flow of traffic, particularly on congested highways. The sign however may if desired be employed in connection with faster moving vehicles such as passenger cars, buses and the like.

The principal object of the invention is to provide a safety sign adapted to be mounted upon the rear of a vehicle and which normally displays some suitable advertising medium but which, at the will of the driver of the vehicle, may be converted into a signal authorizing the driver of a following vehicle to pass or indicating that the road ahead is clear for passing at the particular moment.

The provision of a convertible sign which is clearly visible both in the day time and at night, one which is extremely simple in its construction, one which is rugged and durable, being comprised of a minimum number of moving parts, and which is consequently unlikely to get out of order are further desirable features that have been borne in mind in the production and development of the present invention.

In the accompanying single sheet of drawings forming part of this specification, one embodiment of the invention is shown, and in the drawing:

Figure 1 is a rear elevation of a safety sign manufactured in accordance with the principles of the invention, showing the same in its advertising position as applied to a vehicle, Figure 2 is a rear elevation similar to Figure 1 but showing the sign in its signalling position. In this view the vehicle has been omitted, Figures 3 and 4 are respectively side elevations of the views shown in Figures 1 and 2, the vehicle being omitted, Figure 5 is a sectional view taken substantially along the line 5—5 of Figure 3, and Figure 6 is an enlarged fragmentary view of a modified form of sign designed for attaining visibility at night.

In all of the above described views, like characters of reference are employed to designate like parts throughout.

The device involves in its general organization a pair of supporting frames 10 and 12 adapted to be mounted upon the rear of a vehicle 13 in spaced parallel relationship. While these frames may be formed in any suitable manner and of any suitable material, they are preferably formed of angle iron or other metal and are generally of U-shaped formation, each having a long arm or base 14, an upright portion 16 and a short horizontal sign-supporting arm 18.

The sign proper or unit is of general T-shape in cross section and consists of a tiltable unit 19 comprised of an upper section 20 adapted to normally occupy a vertical position, and a lower section 22 which normally occupies a horizontal position. The lower longitudinal edge of the upper section 20 abuts against the upper face of the lower section 22 and extends medially, or nearly so, thereacross. The sections are held in relative position by means of triangular gusset plates 24 which are held in position at opposite ends of the sign unit by means of screws or the like that extend into the material of which the sign proper is formed. The sign unit may be formed of any suitable size and of any suitable material.

The rear face of the normally vertically extending section 20 has painted or otherwise applied thereon any suitable advertising matter such as a trade name, word, symbol, design, or the like and which is designated at 26. The lower face of the section 22 has similarly applied thereon a suitable signal such as the words "You may pass" shown at 28. If desired any other signal conveying the same idea may alternatively be employed.

In order to enhance the visibility of the advertising matter and the signal at night, a series of reflector buttons such as are designated at 27 in Fig. 6 may be arranged to convey the desired effect on the respective display surfaces of the sign. Irrespective however of the manner in which the desired effect is attained, the essential features of the invention are always preserved.

The sign unit 19 is pivoted for tilting movement between the supporting frames 10 and 12 in such a manner that either the advertising matter 26 or the signal 28 may be selectively brought into vertical position so as to be visible from the rear of the supporting vehicle 13. Toward this end, each end of the upper section 20 is supported for swinging movement from the frames 10 and 12 by means of a stud 30 in the form of a wood screw (clearly shown in Fig. 5), which wood screws pass through openings 34 in the gusset plates 24 and are anchored in the wood or other material from which the section 20 is formed. A plurality of thrust washers 36 are positioned between the gusset plates 24 and the respective frames 10 and 12.

The axis selected for pivotal support of the sign unit 19 is well above the center of gravity of the unit and thus a degree of stable equilibrium is imparted to the tiltable sign in order that the upper section 20 will normally occupy a vertical position with the advertising matter 26 clearly visible from the rear.

In order to prevent undue swinging movement of the sign unit 19 when rough roads are encountered, a limit stop, best shown in Figures 2 and 3, and in the form of a bracket 38 is secured in any suitable manner, as for example by means of wood screws, to the rear edge of the lower section 22. This limit stop is designed to come into contact with a vertical portion of the frame and limit the rearward tilting movement of the unit 19 beyond the vertical. A second limit stop 39 similarly secured to the lower portion of the section 20 and designed to engage the lower edge of the arm 18 also limits the rearward tilting movement of the unit.

Any suitable means for operating the sign to bring either symbol or legend into view may be used. In Figure 4 I have shown a lever 40 which is pivoted for swinging movement as at 42 to some stationary part of the vehicle. A link 54 which may be in the form of a wire having a coil spring 56 or other device to take up lost motion has one end thereof secured to a pin 58 positioned at one end of the upper sign section 20 above the tilting axis of the sign unit. The other end of this link is operatively secured in the customary manner to a depending portion of the lever 40 as at 60.

When the driver of the truck notices that a car is behind him which may want to pass he grasps the lever 40 and pulls it toward him, thus swinging the sign from the position shown in Figure 3 to that shown in Figure 4. The words "You may pass" are now displayed to the car at the rear. The driver may hold the sign in this position until the vehicle behind him has passed. The lever 40 may now be released and the sign now being in unstable equilibrium will swing back by gravity to the original position shown in Figure 3 in which the legend, such as that shown at 26, is now displayed.

I claim:—

A safety sign adapted to be mounted on the rear of a vehicle comprising in combination a pair of spaced supporting frames secured to the vehicle, a tiltable sign composed of a pair of sections, each having display surfaces thereon, one of said sections being wider and heavier than the other section so that said section will normally tend to move to a horizontal position, the second section being secured along one edge to an intermediate portion of the first section, means for pivotally connecting the second section adjacent the first section to the frames so that said sign will possess a material degree of stable equilibrium and the first section will normally tend to remain in an obscure horizontal position, and remote control means for moving the first section to a vertical display position.

RALPH M. SLOUGH.